April 2, 1946.  J. H. BOOTH  2,397,464
SEAL STRUCTURE
Filed Oct. 30, 1943
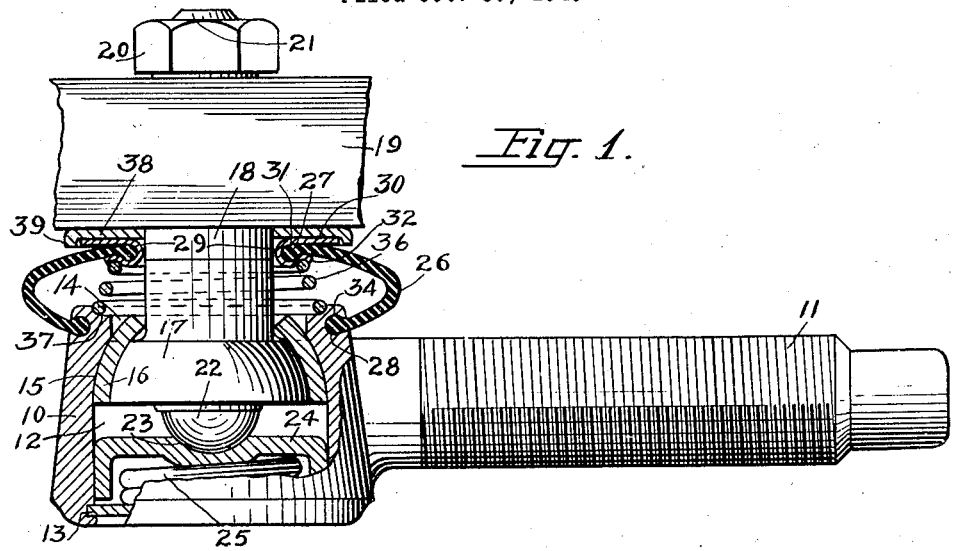
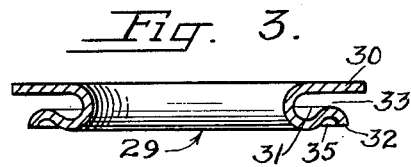
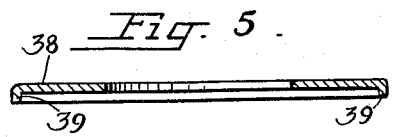
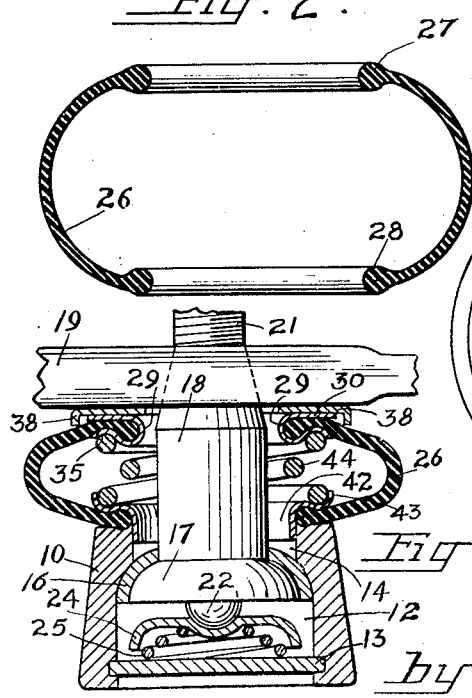
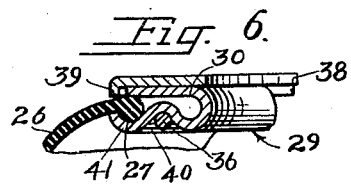
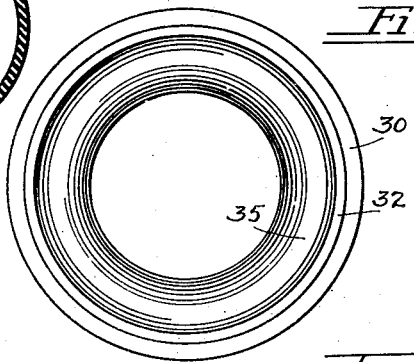
Inventor
James H. Booth.
by Charles *[signature]* Attys Patented Apr. 2, 1946

2,397,464

UNITED STATES PATENT OFFICE 2,397,464

SEAL STRUCTURE

James H. Booth, Detroit, Mich., assignor to Thompson Products, Inc., a corporation of Ohio Application October 30, 1943, Serial No. 508,361

6 Claims. (Cl. 287—90)

My invention relates to sealing structure adapted particularly for application to joints between relatively movable members for preventing the entrance of dust, dirt or water to the joints and for preventing the escape of lubricant from the joints, and which sealing structure will respond to relative movement of the joined members without losing any of its sealing characteristics.

An important object of the invention is to provide sealing structure comprising an annular sealing element of pliable and flexible material such as Neoprene, and improved means for effecting seal engagement of the ends of the sealing element with the respective structure members which are jointed together.

Another object is to provide improved means for so applying the ends of the flexible sealing element to the joined together members that the sealing element may flex during relative rotation of other movement of the structural parts but without being subjected to torsional movement or friction engagement thereof with the members.

A further object is to provide sealing structure in which one end of the flexible sealing element is stationarily secured to one of the joined members, and the other end of the sealing element is encased in a metal ferrule which has bearing against a smooth bearing surface provided on the other joined member whereby the joined members may rotate or move otherwise relatively but without subjecting the sealing element to any torsional movement or strain.

The above enumerated and other features of the invention are embodied in the structure shown on the drawing in which:

Figure 1 shows my improved sealing structure applied to the joint between a tie rod and an actuating member, the joint and the sealing structure being in section;

Figure 2 is a diametral cross-section of the flexible sealing element in its normal condition;

Figure 3 is a diametral cross section of a ferrule for the upper end of the sealing element;

Figure 4 is an underside view of the ferrule;

Figure 5 is a diametral cross-section of a washer engaged by the ferrule when the sealing structure is in service position;

Figure 6 shows an alternate connection between the end of the sealing element and the ferrule; and Figure 7 is a view similar to Figure 1 but showing a modified arrangement for applying the lower end of the sealing element to one of the joined structural members.

Although the drawing shows my improved seal structure applied to the joint in a tie rod assembly, it is to be understood that the sealing structure would be useful in all types of linkage wherein relative limited movement is desired.

On the drawing 10 designates the joint housing or socket member having the threaded shank 11 extending therefrom for receiving the end of a tie rod or other link member (not shown). The housing 10 defines a cylindrical chamber 12 which is closed at its bottom by a plate 13 and from the upper end of which extends the opening 14 below which opening the inner wall of the chamber is spherical as indicated at 15. This spherical surface receives the spherical bearing plate or cap 16 secured to the head 17 at the lower end of the stud 18 secured in a structure member 19 by a nut 20 engaging the threaded end 21 of the stud, the stud extending upwardly through the opening 14 in the housing 10.

Extending from the inner end of the stud head 17 is the semi-spherical bearing boss or button 22 which engages in the bearing recess 23 and the bearing plate 24 pressed upwardly against the boss by a spring 25, this spring pressure keeping the stud bearing cap 16 in bearing engagement with the housing bearing surface 15.

Describing now the sealing structure, it comprises the annular sealing element 26 which, in its normal state as shown on Figure 2, is of substantially semi-circular cross-section. This sealing element is preferably of material such as Neoprene or other suitable flexible and pliable material impervious to dust, dirt or water and resistant to lubricant such as oil or grease with which the chamber 12 of the joint housing may be filled for lubrication of the various bearing surfaces. At the ends of the sealing element the material is thickened and shaped to provide circular beads or heads 27 and 28 respectively.

For the bead or head 27 a ferrule 29 is provided and formed of sheet metal such as steel. As best shown by Figures 3 and 4, this ferrule is annular and of substantially U-shaped section. It may be formed by deflecting downwardly and outwardly the middle portion of a sheet metal disk. The top leg 30 remains flat to form a bearing plate while the deflected portion defines the substantially circular recess 31 and terminates in the upwardly convex end 32 which with the flat part 30 defines a throat 33 leading to the recess 31. As shown on Figure 1, the bead 27 of the sealing element 26 is forced through the throat 33 of the ferrule for engagement in the annular recess 31 whose diameter may be somewhat less than the diameter of the bead 27 so that the bead will be compressed and a tight sealed joint will result between the ferrule and the sealing element. The sealing element 26 with the ferrule thereon is applied around the stud 18 before the stud is secured in the structure 19. As shown on Figure 1, the lower bead 28 is secured to the upper end of the joint housing 10, the housing having the annular recess 34 formed in its outer side into which the bead 28 is forced and compressed to be thus secured to the housing 10 to hold the sealing element against rotation relative to the housing. The recess 35 in the ferrule in the outer side of the convex end 32 thereof forms a seat for the upper end of a spring 36 which at its lower end seats in the annular recess 37 provided in the upper end of the housing 10. The spring may hold the flat portion 30 of the ferrule directly in bearing engagement against the structure 19, but in order to reduce the bearing friction I preferably introduce a bearing washer 38 between the ferrule and the member 19, this washer being a smooth bearing metal or it may be of plastic material. The washer may be provided with a depending flange 39 to stiffen the washer and also to form a retainer around the ferrule to limit its lateral displacement.

The washer 38 is engaged by the flat wall 30 of the ferrule to be held thereagainst by the spring 36. The metal of the ferrule will have a comparatively smooth surface while the structure member 19 is usually comparatively rough and therefore the friction between the ferrule and the smooth washer will be considerably less than the friction between the washer and the member 19. Therefore, during relative rotation of the housing 10 and member 19 the sealing member will not be subjected to destructive torsion or twist. For example, if the member 19 is swung for rotation of the stud 18 relative to the housing 10, the washer 38 will move relative to the ferrule and the sealing element will not be rotated. The sealing element will, however, readily flex to follow any swinging or wig-wagging movement of the stud relative to the housing 10. Under all conditions of relative movement between the two jointed together members, the sealing element will prevent the entrance of dust, dirt or moisture and will prevent the escape of lubricant from the housing 10. The pressure of the spring 36 against the ferrule keeps the ferrule tightly closed around the bead 27 of the sealing member and also maintains sealing engagement between the ferrule and the washer and the washer and the member 19.

In the modified arrangement shown on Figure 6, the inner leg of the ferrule 29 is deflected upwardly intermediate its ends to provide the annular recess 40 for the spring 36, the outer end of the leg being bent to form the annular cup 41 for the head or bead 27 of the sealing element 26. Under pressure of the spring 36 this lower leg of the ferrule will be forced upwardly toward the flat or upper leg of the ferrule in order to securely clamp the bead 27 between the two legs of the ferrule with sealing engagement therewith.

In the modified arrangement shown on Figure 7, the upper bead of the sealing element is provided with a ferrule for engagement with a washer 38 like in the arrangement shown on Figure 1. However, other means are provided for anchoring the lower bead 28 of the sealing element to the housing 10. A sheet metal bushing 42 is provided for extending a distance into the opening 14 of the housing 10 and has the laterally extending flange 43 between which and the top of the housing 10 the bead 28 of the sealing element is received. The outer end of this flange is concave to receive the lower end of the spring 44 which at its upper end engages in the recess 35 of the ferrule which receives the bead 27 of the sealing element. The spring 44 is of the barrel type so that it may readily nest under lateral swing or wig-wagging of the stud 18. With the arrangement shown in Figure 7, the sealing element together with the ferrule, the bushing, and the spring will form a unit assembly which may be readily applied between the joint connected members without any machining work being necessary on these members. When applied, the bushing 42 inserted into the opening of the housing 10 will hold the assembly properly aligned. The pressure of the spring 44 against the bead 28 will frictionally hold this bead against the top of the housing 10 so as to prevent any rotational movement of the sealing element.

In my improved sealing structure the flexible and pliable non-metallic sealing element is operable to perform its sealing functions without at any time having direct sliding or moving engagement with other parts, and therefore rubbing, abrasion or wear, which might weaken or destroy the efficiency of the sealing element, is eliminated.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. Sealing structure for the joint between two relatively rotatable operating members comprising an annular sealing element of yieldable material, means for securing said element at one end to one of said members against rotation relative thereto, a ferrule receiving the other end of said element and having a smooth bearing surface, means providing a smooth bearing surface on the other operating member, and spring means for holding said surfaces in sliding bearing engagement whereby said operating members may be relatively rotated without causing torsional distortion of said sealing element.

2. Sealing structure for a joint between two relatively rotatable operating members comprising an annular sealing element of yieldable sealing material and disposed between said members concentric with the joint axis, means securing one end of said element to one of said members, a ferrule receiving the other end of said element, and means affording an anti-friction sliding bearing engagement between said ferrule and the other operating member whereby said other member may be rotated relative to said one member without imparting rotary movement to said sealing element.

3. Sealing structure for a joint between two relatively rotatable operating members comprising an annular sealing element of flexible material, means for securing one end of said element to one of said members, a ferrule secured to the other end of said element and presenting a smooth bearing surface, a washer interposed between said ferrule and the other operating member and presenting a smooth bearing surface to the bearing surface of said ferrule, and a spring for maintaining bearing engagement between said bearing surfaces, said smooth bearing surfaces permitting rotary movement of said other operating member without subjecting said sealing element to rotary movement.

4. A sealing assembly for a joint of the socket and stud type comprising an annular sealing element of non-metallic flexible material surrounding the axis of said joint, a clamping ring extending into the opening of the socket member of the joint and having an outwardly extending clamping flange between which and said socket member one end of said sealing element is received, a ferrule receiving the other end of said sealing element and presenting a bearing surface, means providing an anti-friction bearing surface rotatable with the stud element of the joint for engagement by said ferrule bearing surface, and a spring functioning to exert pressure against said clamping ring to clamp the one end of said sealing element to the socket member and to exert pressure against said ferrule for maintaining engagement between said bearing surfaces whereby relative rotation of the joint members will be prevented from causing torsional movement of said sealing element.

5. A sealing assembly for a joint comprising an annular sealing element of non-metallic flexible material surrounding the axis of the joint, means securing one end of said element to one of the joint members, a metallic bearing ring clamped around the other end of said element, and a washer providing a bearing surface for bearing engagement between said bearing ring and the other member of the joint whereby the joint members may rotate relatively without imparting torsional strain to said sealing element, said washer having a peripheral depending flange forming a retainer around said bearing ring to limit the lateral displacement thereof and of the sealing element clamped thereby.

6. A sealing assembly for a joint of the socket and stud type comprising an annular sealing element of non-metallic flexible material surrounding the axis of the joint, a bushing extending into the opening of the socket member of the joint and having an outwardly extending clamping flange between which and said socket member one end of said sealing element is received, a protecting and bearing ring clamped around the other end of said sealing element, means providing a bearing surface around said stud element for engagement by said bearing ring, and a spring functioning to exert pressure against said bushing and said ring to clamp the one end of said sealing element to the socket member and to hold said bearing ring in bearing engagement with said bearing surfaces.

JAMES H. BOOTH.